US 6,563,509 B1

(12) United States Patent
Harris

(10) Patent No.: US 6,563,509 B1
(45) Date of Patent: May 13, 2003

(54) SEEDING MAP HAVING INTERMEDIATE SEED VALUES

(75) Inventor: Jerry Harris, Newberry, FL (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/513,394

(22) Filed: Feb. 25, 2000

(51) Int. Cl.$^7$ .................................................. G06K 9/00
(52) U.S. Cl. ........................ 345/592; 345/589; 345/426
(58) Field of Search ................................. 345/426, 592, 345/589, 593, 596, 599, 606, 690; 702/5; 434/150

(56) References Cited

U.S. PATENT DOCUMENTS

| | | | | |
|---|---|---|---|---|
| 4,646,154 A | * | 2/1987 | Shinohara et al. | 348/590 |
| 5,684,895 A | * | 11/1997 | Harrington | 382/233 |
| 5,731,820 A | * | 3/1998 | Broekhuijsen | 345/422 |
| 5,835,634 A | * | 11/1998 | Abrams | 382/222 |
| 5,839,090 A | * | 11/1998 | Zoraster | 702/5 |
| 5,974,172 A | * | 10/1999 | Chen | 382/164 |
| 5,986,673 A | * | 11/1999 | Martz | 345/437 |
| 6,040,835 A | * | 3/2000 | Gibson | 345/424 |
| 6,141,442 A | * | 10/2000 | Chen | 382/164 |
| 6,329,977 B1 | * | 12/2001 | McNamara et al. | 345/147 |

OTHER PUBLICATIONS

John C. Russ, The Image Processing Handbook, CRC Press, Inc., pp. 321–328, 436, 441 (1992).
Azriel Rosenfeld and Avinash Kak, Digital Picture Processing, Second Edition, vol. 2, Academic Press, pp. 204–211 (1982).
J. Christian Russ and John C. Russ, "Improved Implementation of a Convex Segmentation Alogrithm", Acta Stereologica, vol. 7, pp. 33–40 (1988).
P. E. Danielsson, "Euclidian Distance Mapping", Computer Graphics Image Processing, vol. 14, pp. 227–248, (1992).

* cited by examiner

Primary Examiner—Jeffery Brier
Assistant Examiner—Daniel J Chung
(74) Attorney, Agent, or Firm—Fish & Richardson P.C.

(57) ABSTRACT

A method and apparatus, including a computer program apparatus, implementing techniques for creating a distance map of an image including a graphical object. The techniques include providing a seeding map of seed pixels having seed values, and using the seeding map to generate a Euclidean distance map. Each seed pixel can correspond to a region of the image. The seed values can include at least three different seed values. A first seed value for a seed pixel can correspond to a region of the image covered by the graphical object by no more than a first threshold amount. A second seed value for a seed pixel can correspond to a region of the image covered by the graphical object by no less than a second threshold amount. Each intermediate seed value for a seed pixel can correspond to a region of the image partially covered by the graphical object by an amount between the first and second threshold amounts.

32 Claims, 2 Drawing Sheets (coverage map)

(seeding map)

(Euclidean distance map)

SEEDING MAP HAVING INTERMEDIATE SEED VALUES

BACKGROUND OF THE INVENTION

The present invention relates to creating a seeding map from a coverage map of a graphical object. The seeding map can be used to seed a Euclidean distance map (EDM) operation to create an EDM of the graphical object.

Current image processing systems seed EDM operations on a grayscale image with a seeding map having integer seed values. One system uses a threshold step to classify all the pixels of the grayscale image as feature pixels or background pixels. For an 8-bit grayscale image, for example, each pixel having a value greater than or equal to a threshold value of 128 is classified-as a feature pixel; each pixel having a value less than the threshold value of 128 is classified as a background pixel. To create the seeding map, the system assigns the feature pixels a first seed value and assigns the background pixels a second seed value. Typically, the first seed value is a minimum integer seed value for the seeding map, and the second seed value is a maximum integer seed value for the seeding map. Once created, the seeding map can be used to seed an EDM operation—a one-pass direct convolution operation or a two-pass distance propagation operation, for example—to create an EDM of the object. Due to the loss of the gray-scaling information during the threshold step, the EDM of the object can reflect aliasing or faceting at the edges of the object.

SUMMARY OF THE INVENTION

In general, in one aspect, the invention provides a method and apparatus, including a computer program apparatus, implementing techniques for creating a distance map of an image including a graphical object. The techniques include providing a seeding map of seed pixels having seed values, and using the seeding map to generate a Euclidean distance map. Each seed pixel can correspond to a region of the image. The seed values can include at least three different seed values. A first seed value for a seed pixel can correspond to a region of the image covered by the graphical object by no more than a first threshold amount. A second seed value for a seed pixel can correspond to a region of the image covered by the graphical object by no less than a second threshold amount. Each intermediate seed value for a seed pixel can correspond to a region of the image partially covered by the graphical object by an amount between the first and second threshold amounts.

Each seed pixel can correspond to a coverage pixel of a coverage map of the graphical object, wherein each coverage pixel has a coverage value. The seed value for each seed pixel can be calculated from the coverage value of the corresponding coverage pixel of the coverage map. The coverage map can be an alpha channel. The first seed value can be a minimum value for the seeding map and the second seed value can be a maximum value for the seeding map. Alternatively, the first seed value can be a maximum value for the seeding map and the second seed value can be a minimum value for the seeding map. Each intermediate seed value can be between the minimum seed value and a value representing a pixel-to-pixel distance in the Euclidean distance map. Each intermediate seed value can be a fractional value.

The seeding map can be used to seed a Euclidean distance map operation to generate the Euclidean distance map. The Euclidean distance map operation can be a one-pass direct convolution operation or a two-pass distance propagation operation. The Euclidean distance map can be used to create a frame around the graphical object. Alternatively, the Euclidean distance map can be used to create a glow to the graphical object.

Advantages that can be seen in implementations of the invention include one or more of the following. The invention can be used to create a seeding map having intermediate seed values representing the grayscale values of the pixels in a coverage map of the object. In the coverage map, the value of each coverage pixel generally indicates a degree of overlap or a degree of transparency. The system can seed an EDM operation with intermediate seed values to create an EDM with little or no aliasing at the edges of the object.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2b shows a 5-by-5 grid of pixels representing a portion of a seeding map created for the object of FIG. 2a.

FIG. 2c shows a 5-by-5 grid of pixels representing a portion of a Euclidean distance map of the object of FIG. 2a.

Like reference numbers and designations in the various drawings indicate like elements.

DETAILED DESCRIPTION

Figure 1A:
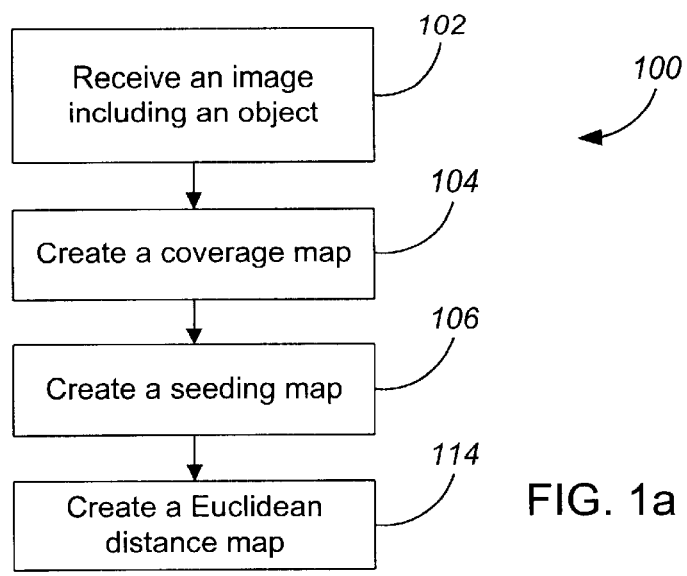
FIGS. 1a and 1b are flowcharts of a process for creating a Euclidean distance map for a graphical object in accordance,with the invention.
Figure 1B:
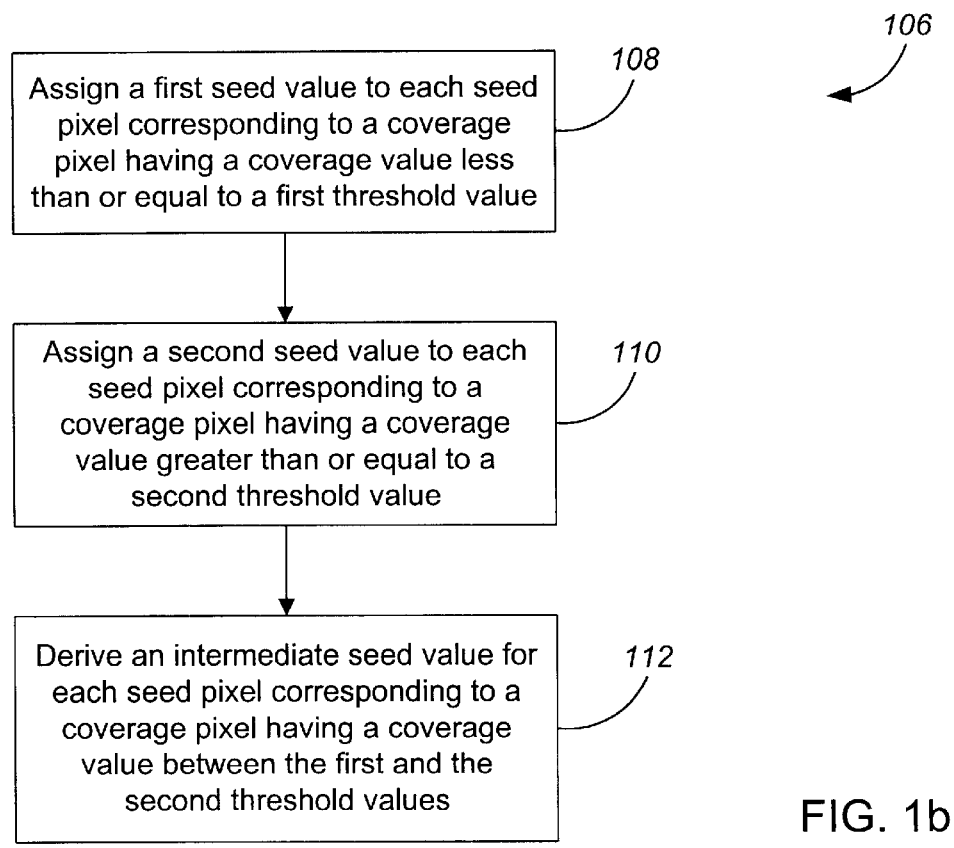

FIGS. 1a and 1b show a process 100 suitable for implementation in a computer program application for creating a seeding map for a graphical object that can be used by the same or a different application to seed a Euclidean distance map (EDM) operation to create an EDM from the object.

Initially, the application receives an image including a graphical object (step 102). The image can be a vector image or a raster image. The application processes the image to create a coverage map of the object (step 104). A coverage map is a raster of pixels ("coverage pixels") corresponding to the image. Coverage pixels have values in the range of zero to one, normalized to some representation; for example, with N-bit pixels, zero can be represented as zero and one can be represented as $2^N-1$. The value of each coverage pixel generally indicates a degree of overlap or a degree of transparency. For example, a value of zero can indicate that the object is fully transparent at the coverage pixel, i.e., in the region of the image corresponding to the coverage pixel, and a value of $2^N-1$ can indicate that the object is fully opaque. In one implementation, the coverage map is an alpha channel. The alpha channel can be the result of an anti-aliased rendering of the object. Generally, the coverage map can be represented as a single or multi-level grayscale image having pixel coverage values ranging from 0 to $2^N-1$, where N is the bit depth of the grayscale image.

The application creates a seeding map of seed pixels having at least three seed values (step 106). In one implementation, the application (i) assigns a first seed value to each seed pixel corresponding to a coverage pixel having a coverage value equal to or less than a first threshold value (step 108); (ii) assigns a second seed value to each seed pixel corresponding to a coverage pixel having a coverage value equal to or greater than a second threshold value (step 110); and (iii) derives an intermediate seed value for each seed pixel corresponding to a coverage pixel having a coverage value between the first threshold value and the second threshold value (step 112). The first and second threshold values can be pre-defined numeric values stored in the application, can be defined by user input, or alternatively, can be defined dynamically based on the object, for example, the distribution of the coverage values in the coverage map. The first and second threshold values determine the amount of gray-scaling information in the coverage map that is "preserved" in an EDM of the object. Typically, a coverage pixel having a coverage value of $2^N-1$ is a feature pixel, a coverage pixel having a coverage value of 0 is a background pixel, and all other coverage pixels having coverage values between 0 and $2^N-1$ are edge pixels. For optimal "preservation" of the grayscale values of the edge pixels, a first threshold value of 0 and a second threshold value of $2^N-1$ can be used.

The seed values can range from a minimum value of 0 to a maximum value equal to the largest value that can be encoded for the numeric precision of the format of the seeding map. The seed values can be stored in a suitable format, such as scaled integer, fixed point or floating point. In general, the feature pixels and the background pixels are assigned the minimum and maximum (or vice versa) available seed values, respectively. The edge pixels are assigned intermediate seed values that are between the minimum seed value and the pixel-to-pixel distance used by the EDM to measure the distance between horizontally or vertically adjacent pixels. It should be noted that the maximum seed value is typically significantly larger than the pixel-to-pixel distance. For example, in an unsigned 16-bit 8 dot 8—high 8 bits whole, low 8 bits fractional—fixed point format, the minimum seed value may be 0, the maximum seed value may be 255.99, and the intermediate seed values may range between 0 and 1.00. Generally, each intermediate seed value is derived using the following formula:

$$seedvalue_{intermediate} = pixdist\left(1 - \frac{coveragevalue}{2^N - 1}\right)$$

where "pixdist" is the value representing the pixel-to-pixel distance in the EDM. Typically, "pixdist" has a value of 1.

Figure 2A:
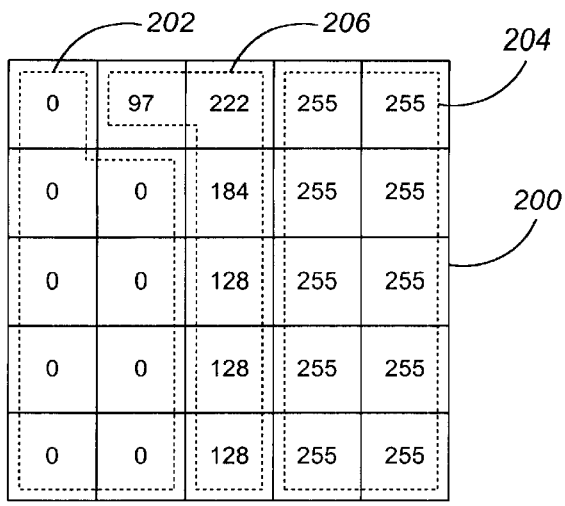
FIG. 2a shows a 5-by-5 grid of pixels representing a portion of a coverage map of an object.
Figure 2B:
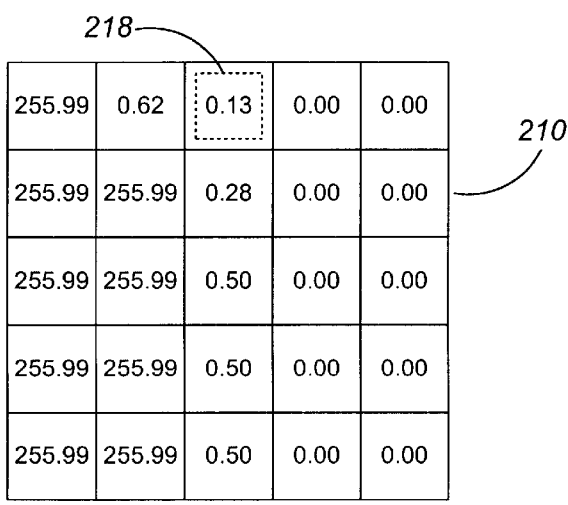

For example, FIG. 2a shows a 5-by-5 grid of coverage pixels representing a portion of a coverage map 200 of an object. Using a first threshold value of 0 and a second threshold value of 255, the application: (i) assigns each seed pixel corresponding to a background pixel 202 a seed value of 255.99; (ii) assigns each seed pixel corresponding to a feature pixel 204 a seed value of 0.00; and (iii) derives for each seed pixel corresponding to an edge pixel 206 an intermediate seed value representing the grayscale value of the corresponding edge pixel in the coverage map, to create the unsigned 16-bit 8 dot 8 fixed point seeding map 210 shown in FIG. 2b.

The seeding map 210 can then be used to seed an EDM operation to create an EDM 212 (FIG. 2c) from the object (step 114). An EDM operation is used to create a distance map in which each distance pixel outside the object, inside the object, or both, has a distance value encoding its "distance" from the nearest edge of the object. Initially, each distance pixel in the EDM 212 corresponding to an edge seed pixel in the seeding map 210 has a distance value encoding its corresponding intermediate seed value. Specifically, the intermediate seed values are copied into the distance values of the corresponding distance pixels in the EDM. Since the edge pixels in the seeding map have intermediate seed values less than the pixel-to-pixel distance in the EDM, the corresponding distance pixels in the EDM also have distance values less than this pixel-to-pixel distance. The distance values of the remaining distance pixels in the EDM 212 are then calculated using a conventional EDM operation, such as a one-pass direct convolution or a two-pass distance propagation operation. The distance can be calculated using any distance metric, such as 4-neighbor path, 8-neighbor path, or Pythagorean units.

Figure 2C:
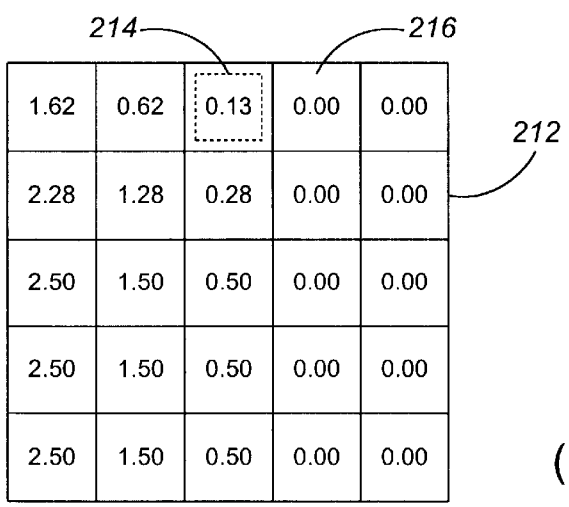

By providing intermediate seed values to the EDM operation, the distance values of the distance pixels in the EDM 212 can encode a straight-line distance that is less than the pixel-to-pixel distance of the distance pixel from its respective closest edge of the object in the EDM 212. This can result in smoother object edges in the EDM 212. The EDM 212 shown in FIG. 2c is in 16-bit 8 dot 8 fixed point format. The EDM operation encodes for distance pixel 214 (corresponding to edge seed pixel 218 in the seeding map 210) a distance value of 0.13 pixel, even though the pixel-to-pixel distance between the distance pixel 214 and its nearest edge of the object (distance pixel 216) is 1 pixel. In addition, because a conventional EDM operation calculates distances of one pixel by adding the pixel-to-pixel distance to the lowest value from the adjacent pixels, these fractional values are propagated through the EDM 212, resulting in a more smoothly varying map.

The EDM 212 can be used by the same or different application to create a frame around the object. For example, the application can create a 10 pixel-wide frame around an object by setting all of the pixels having a brightness value encoding a distance D of 10 or less to opaque, and setting the remaining pixels to transparent. Alternatively, the frame could include pixels at the edge having partial opacity. Specifically, all the pixels encoding a distance D of 10 or less could be set to opaque, all the pixels encoding a distance D of 11 or more could be set to transparent, and the pixels encoding a distance D of between 10 and 11 could be set to a partial opacity equal to the fractional portion of the distance, i.e., D–10. The EDM 212 can also be used to apply an inward glow, an outward glow, or both, to the object. Seeding the EDM operation with intermediate seed values results in a frame or glow having little or no aliasing at the edges.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results.

The seeding map can be constructed in the memory in which the coverage map was stored, thereby overwriting the coverage map. Similarly, the EDM can be constructed in the memory in which the seeding map was stored. In one implementation, the first seed value is the minimum value, e.g., 0, and the second seed value is the maximum value, e.g., 1, of the seeding map.

What is claimed is:

1. A method for creating a distance map of an image including a graphical object, comprising:
   generating a Euclidean distance map using a seeding map of seed pixels having seed values, each seed pixel corresponding to a region of the image, the seed values including at least three different seed values, including at least a first seed value for a seed pixel corresponding to a region of the image covered by the graphical object by no more than a first threshold amount, a second seed value for a seed pixel corresponding to a region of the image covered by the graphical object by no less than a second threshold amount, and an intermediate seed value for a seed pixel corresponding to a region of the image partially covered by the graphical object by an amount between the first and second threshold amounts,
   wherein each seed pixel corresponds to a coverage pixel of a coverage map of the graphical object, wherein each coverage pixel has a coverage value; and
   the seed value for each seed pixel is calculated from the coverage value of the corresponding coverage pixel of the coverage map.

2. The method of claim 1, wherein coverage map is an alpha channel.

3. The method of claim 1, wherein the graphical object is a vector-based graphical object.

4. The method of claim 1, wherein:
   the first seed value is a minimum value for the seeding map; and
   the second seed value is a maximum value for the seeding map.

5. The method of claim 1, wherein:
   the first seed value is a maximum value for the seeding map; and
   the second seed value is a minimum value for the seeding map.

6. The method of claim 4 or 5, wherein each intermediate seed value is between the minimum seed value and a value representing a pixel-to-pixel distance in the Euclidean distance map.

7. The method of claim 6, wherein each intermediate seed value is a fractional value.

8. The method of claim 1, further comprising using the seeding map to seed a Euclidean distance map operation to generate the Euclidean distance map.

9. The method of claim 8, wherein the Euclidean distance map operation is a one-pass direct convolution operation or a two-pass distance propagation operation.

10. The method of claim 1, further comprising creating a frame around the graphical object.

11. The method of claim 1, further comprising applying a glow to the graphical object.

12. A seeding map for seeding a calculation of a distance map of a graphical object in an image, the map comprising:
    seed pixels each having a seed value, each seed pixel corresponding to a region of the image, the seed values including at least three different seed values, including at least a first seed value for a seed pixel corresponding to a region of the image covered by the graphical object by no more than a first threshold amount, a second seed value for a seed pixel corresponding to a region of the image covered by the graphical object by no less than a second threshold amount, and an intermediate seed value for a seed pixel corresponding to a region of the image partially covered by the graphical object by an amount between the first and second threshold amounts,
    wherein each seed pixel corresponds to a coverage pixel of a coverage map of the graphical object, wherein each coverage pixel has a coverage value; and
    the seed value for each seed pixel is calculated from the coverage value of the corresponding coverage pixel of the coverage map.

13. The map of claim 12, wherein:
    the first seed value is a minimum value for the seeding map; and
    the second seed value is a maximum value for the seeding map.

14. The map of claim 12, wherein:
    the first seed value is a maximum value for the seeding map; and
    the second seed value is a minimum value for the seeding map.

15. The map of claim 13 or 14, wherein each intermediate seed value is between the minimum seed value and a value representing a pixel-to-pixel distance in the Euclidean distance map.

16. The map of claim 15, wherein each intermediate seed value is a fractional value.

17. A method of manipulating an image including a graphical object, the image having a plurality of image pixels, comprising:
    creating a coverage map of the graphical object, the coverage map having a plurality of coverage pixels, each coverage pixel having a coverage value;
    creating a seeding map of seed pixels, comprising:
        assigning a first seed value to each seed pixel corresponding to a coverage pixel having a coverage value equal to or less than a first threshold value;
        assigning a second seed value to each seed pixel corresponding to a coverage pixel having a coverage value equal to or greater than a second threshold value; and
        deriving an intermediate seed value for each seed pixel corresponding to a coverage pixel having a coverage value between the first threshold value and the second threshold value, wherein the intermediate seed value is derived in part from the coverage value of its respective coverage pixel; and seeding a Euclidean distance map operation with the seeding map to create a Euclidean distance map of the graphical object.

18. The method of claim 17, wherein the Euclidean distance map operation is a one-pass direct convolution operation or a two-pass distance propagation operation.

19. The method of claim 17, wherein the graphical object is a vector-based graphical object.

20. The method of claim 17, wherein the coverage map is an alpha channel.

21. A computer program product stored on a machine-readable medium for creating a distance map of an image including a graphical object, the product comprising instructions operable to cause a programmable processor to:

generate a Euclidean distance map using a seeding map of seed pixels having seed values, each seed pixel corresponding to a region of the image, the seed values including at least three different seed values, including at least a first seed value for a seed pixel corresponding to a region of the image covered by the graphical object by no more than a first threshold amount, a second seed value for a seed pixel corresponding to a region of the image covered by the graphical object by no less than a second threshold amount, and an intermediate seed value for a seed pixel corresponding to a region of the image partially covered by the graphical object by an amount between the first and second threshold amounts, wherein each seed pixel corresponds to a coverage pixel of a coverage map of the graphical object, wherein each coverage pixel has a coverage value; and the seed value for each seed pixel is calculated from the coverage value of the corresponding coverage pixel of the coverage map.

22. The product of claim 21, wherein the coverage map is an alpha channel.

23. The product of claim 21, wherein the graphical object is a vector-based graphical object.

24. The product of claim 21, wherein:

the first seed value is a minimum value for the seeding map; and the second seed value is a maximum value for the seeding map.

25. The product of claim 21, wherein:

the first seed value is a maximum value for the seeding map; and the second seed value is a minimum value for the seeding map.

26. The product of claim 24 or 25, wherein each intermediate seed value is between the minimum seed value and a value representing a pixel-to-pixel distance in the Euclidean distance map.

27. The product of claim 26, wherein each intermediate seed value is a fractional value.

28. The product of claim 21, further comprising instructions operable to cause a programmable processor to:

use the seeding map to seed a Euclidean distance map operation to generate the Euclidean distance map.

29. The product of claim 28, wherein the Euclidean distance map operation is a one-pass direct convolution operation or a two-pass distance propagation operation.

30. The product of claim 21, further comprising instructions operable to cause a programmable processor to:

create a frame around the graphical object.

31. The product of claim 21, further comprising instructions operable to cause a programmable processor to:

apply a glow to the graphical object.

32. A computer program product stored on a machine-readable medium for manipulating an image including a graphical object, the product comprising instructions operable to cause a programmable processor to:

create a coverage map of the graphical object, the coverage map having a plurality of coverage pixels, each coverage pixel having a coverage value;

create a seeding map of seed pixels, comprising:
assigning a first seed value to each seed pixel corresponding to a coverage pixel having a coverage value equal to or less than a first threshold value;
assigning a second seed value to each seed pixel corresponding to a coverage pixel having a coverage value equal to or greater than a second threshold value; and
deriving an intermediate seed value for each seed pixel corresponding to a coverage pixel having a coverage value between the first threshold value and the second threshold value, wherein the intermediate seed value is derived in part from the coverage value of its respective coverage pixel; and seed a Euclidean distance map operation with the seeding map to create a Euclidean distance map of the graphical object.

* * * * *